(12) United States Patent
Attias (10) Patent No.: US 11,131,072 B2
(45) Date of Patent: Sep. 28, 2021

(54) FLOATING BREAKWATER

(71) Applicant: Eyal Attias, Jerusalem (IL)

(72) Inventor: Eyal Attias, Jerusalem (IL)

( * ) Notice: Subject to any disclaimer, the term of this patent is extended or adjusted under 35 U.S.C. 154(b) by 0 days.

(21) Appl. No.: 16/623,407

(22) PCT Filed: May 29, 2018

(86) PCT No.: PCT/IL2018/050584
§ 371 (c)(1),
(2) Date: Dec. 17, 2019

(87) PCT Pub. No.: WO2018/235067
PCT Pub. Date: Dec. 27, 2018

(65) Prior Publication Data
US 2020/0392686 A1    Dec. 17, 2020

(30) Foreign Application Priority Data
Jun. 21, 2017   (IL) .......................................... 253086

(51) Int. Cl.
*E02B 3/06* (2006.01)
(52) U.S. Cl.
CPC .................... *E02B 3/062* (2013.01)
(58) Field of Classification Search
CPC ............... E02B 3/062; E02B 3/06; E02B 3/04
See application file for complete search history.

(56) References Cited

U.S. PATENT DOCUMENTS

| | | | | |
|---|---|---|---|---|
| 1,846,278 A | * | 2/1932 | Roane | E02B 3/062 405/27 |
| 3,085,404 A | * | 4/1963 | Smith | E02B 3/06 405/26 |
| 3,237,414 A | * | 3/1966 | Lorenzg | E02B 3/062 405/26 |
| 3,800,543 A | | 4/1974 | Moore | |
| 3,863,455 A | * | 2/1975 | Fuller | E02B 3/062 405/27 |
| 4,027,486 A | * | 6/1977 | Dougherty | E02B 3/062 405/27 |
| 4,098,086 A | | 7/1978 | Desty et al. | |
| 4,776,724 A | | 10/1988 | Isozaki | |
| 4,824,286 A | * | 4/1989 | Waas | E02B 3/062 405/27 |
| 6,554,534 B1 | * | 4/2003 | Butterfield | E02B 15/0814 405/63 |
| 7,572,083 B1 | | 8/2009 | Bishop et al. | |

(Continued)

FOREIGN PATENT DOCUMENTS

| | | |
|---|---|---|
| CN | 105019399 A | 11/2015 |
| GB | 1457183 | 12/1976 |
| SU | 1054485 | 11/1983 |

*Primary Examiner* — Benjamin F Fiorello
(74) *Attorney, Agent, or Firm* — AlphaPatent Associates Ltd.; Daniel J. Swirsky (57) ABSTRACT

A breakwater (10A), including a floating plate (22), including: a floating plate (22), width (54) thereof being at least one wavelength (12) and being non-bendable; and anchors (26), for anchoring the floating plate (22), thereby not allowing the water waves (30A) propagating along the width (54) of the plate (22) to bend the width (54) of the plate (22), thereby not allowing the water waves (30A) to bend themselves along the at least one wavelength (12).

8 Claims, 6 Drawing Sheets

(56) References Cited

U.S. PATENT DOCUMENTS

| | | | |
|---|---|---|---|
| 2006/0088381 A1* | 4/2006 | Manzone | E02B 3/06 405/31 |
| 2006/0216115 A1* | 9/2006 | Cho | E02B 3/062 405/30 |
| 2008/0022915 A1 | 1/2008 | Budd | |
| 2014/0205381 A1* | 7/2014 | McClure | A01G 13/10 405/26 |

* cited by examiner

FLOATING BREAKWATER

TECHNICAL FIELD

The invention relates to the field of breakwaters. More particularly, the invention relates to a floating breakwater.

BACKGROUND

Figure 1:
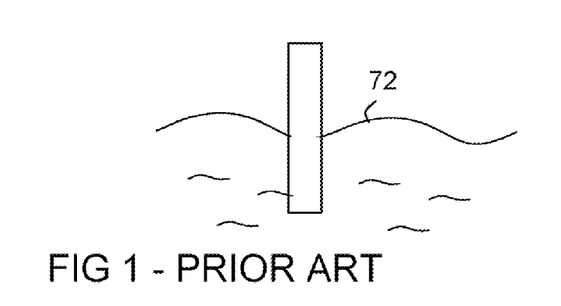
FIG. 1 is a front view of a prior art floating breakwater of a first type.

FIG. 1 is a front view of a prior art floating breakwater of a first type.

This type is named herein "massive floating breakwater", as it constitutes a massive lump, designed to have an top region disposed significantly above the water level, and a bottom region disposed below the water level, for stabilizing the top region. The waves attempting to climb are blocked by the top region.

Figure 2:
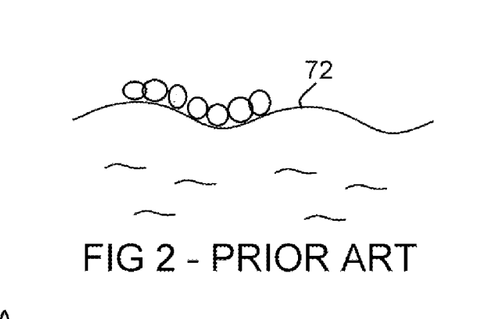
FIG. 2 is a front view of a prior art floating breakwater of a second type.

FIG. 2 is a front view of a prior art floating breakwater of a second type.

This type is named herein "attenuating floating breakwater", as it constitutes a plurality of floating lumps, chained one to the other. The attenuating floating breakwater does not reliably blocks the waves, but rather attenuates them.

There is a long felt need to provide a solution to the above-mentioned and other problems of the prior art.

SUMMARY

A breakwater, including a floating plate, including: a floating plate, width thereof being at least one wavelength and being non-bendable.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 3:
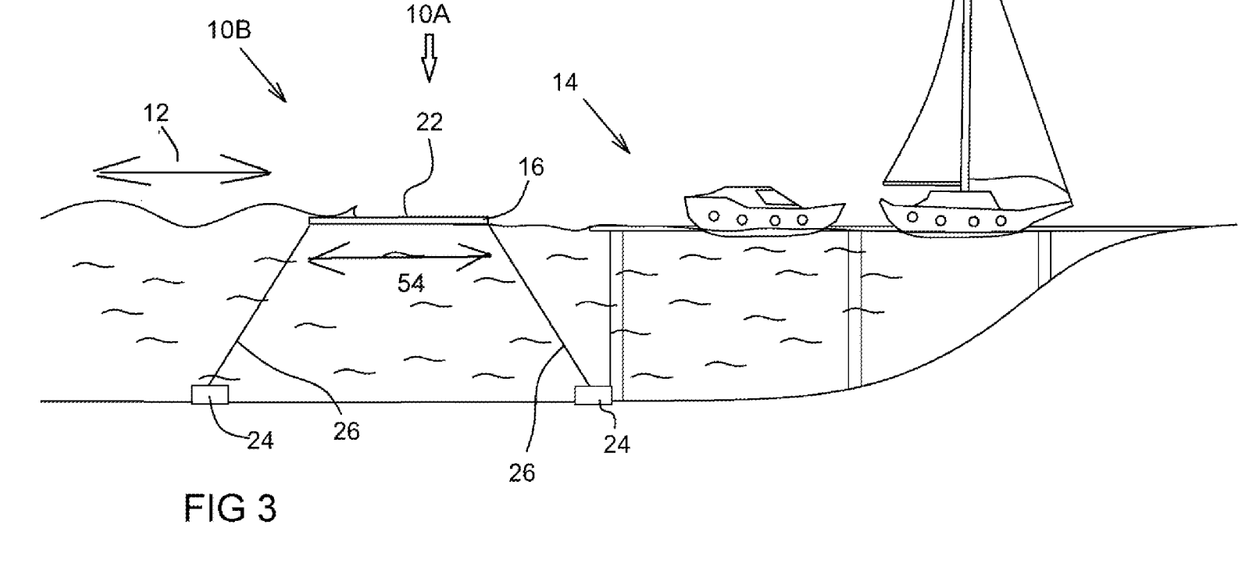
FIG. 3 is a side view of a breakwater according to one embodiment of the invention, and a harbor according to one embodiment of the invention, including the breakwater.

FIG. 3 is a side view of a breakwater according to one embodiment of the invention, and a harbor according to one embodiment of the invention, including the breakwater.

A harbor 10B according to one embodiment of the invention includes a breakwater 10A according to one embodiment of the invention, which includes a floating plate 22; and anchors 26, for maintaining the location of floating plate 22.

The width 54 of plate, for breaking the sea waves 30A, is at least the length of wavelength 12. For example, for waves 30A having a wavelength 12 of 40 meters, width 54 of plate 12 is at least 40 meters; and for waves having a wavelength of 150 meters, such as at high seas, width 54 of plate 12 must be at least 150 meters.

In contrast to prior art breakwaters, including floating ones, which block the water waves above the breakwater, this relatively large width 54 of breakwater 10A allows floating plate 22 to be thin and yet break the waves, since the blocking of the wave is along width 54, rather than along a height above the sea level.

Figure 4:
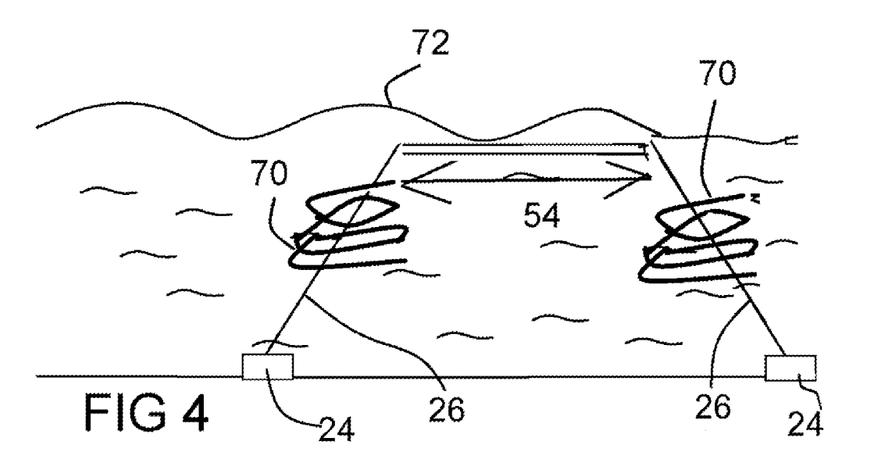
FIG. 4 depicts the anchors according to another embodiment.

FIG. 4 depicts the anchors according to another embodiment.

According to one embodiment, anchors 26 as well pull plate 22 to be slightly lower than the sea level. Each anchor 26 includes a strength gauge 70. Anchors 26 are deployed for providing, at non-wavy environment equal strength to all anchors 26. Consequently, many anchors 26, even though being placed far one from the other (hundreds of meters) will absorb together in a shared manner, the attacks of various waves.

Figure 5:
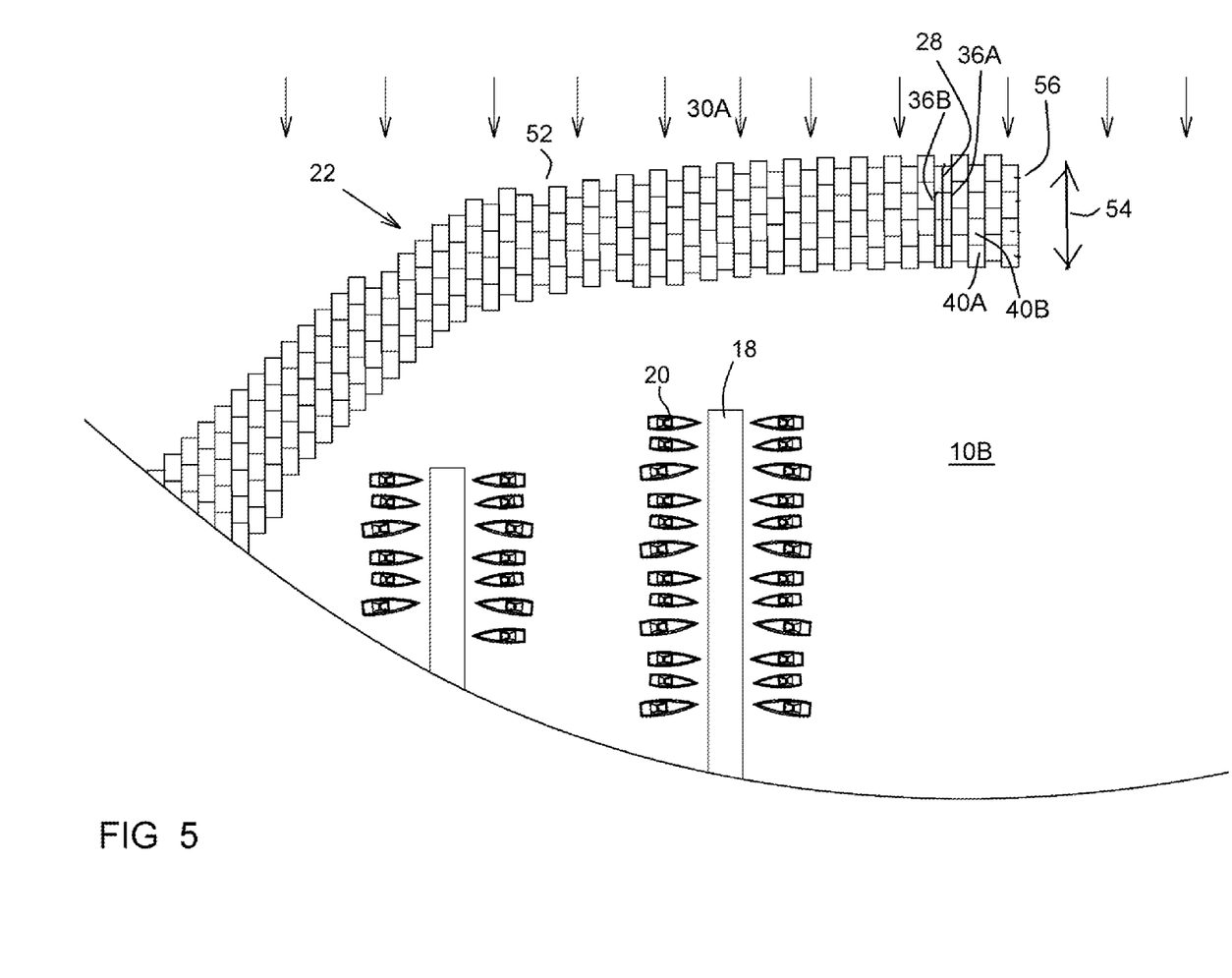
FIG. 5 is a top view of the breakwater and of the harbor of FIG. 3.

FIG. 5 is a top view of the breakwater and of the harbor of FIG. 3.

Plate 22 of breakwater 10A typically is to be long and narrow, e.g., length 800 meters and width 40 meters, such that the length (long side) 52 is placed for receiving water waves 30A.

Plate 22 may include a plurality of subsidiary plates 40A, 40B, etc., being connected one to the other.

However, the narrow side 56, being width 54 must be relatively rigid, for not being bent by waves 30A to the temporal wavy shape thereof. Thus, according to one embodiment, plate 22 includes rigid poles 36A, 36B, etc., being parallel one to the other.

Figure 6:
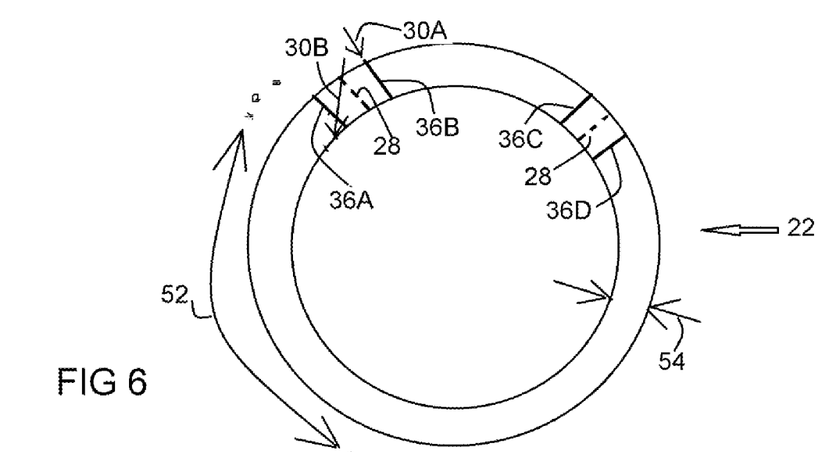
FIG. 6 is a top view of a floating breakwater lacking a shore.

FIG. 6 is a top view of a floating breakwater lacking a shore.

Rigid poles 36A, 36B, etc., are parallel one to the other only regarding adjacent ones. Thus, for a curved floating breakwater, such as ring of FIG. 6, adjacent rigid poles 36A and 36B are disposed parallel one to the other, whereas they are not parallel to rigid pole 36C.

It is preferable to provide folding lines/regions 28 parallel to rigid poles 36A and 36B. According to one embodiment, folding line 28 is between adjacent rigid poles 36A and 36B, and between adjacent rigid poles 36C and 36D. According to another embodiment, a first folding line 28 is rigid pole 36A itself, and a second folding line is pole 36B, etc., meaning that each rigid pole 36A, 36B, etc. constitutes a hinge.

Folding lines 28 allow the water waves to bend these foldable lines 28, rather than break rigid poles 36A and 36B. Further, folding lines 28 in plate 22 allow plate 22 to include prefabricated modular elements, such as subsidiary plates 40A, 40B, etc. of FIG. 9.

Waves 30B not propagating parallel to rigid poles 36A and 36B, even though they cross a foldable line 28, are further blocked by plate 22, since they must cross a longer distance along plate 22.

In this ringed plate 22 example, length 52 is the perimeter of the ring.

Figures 7, 8:
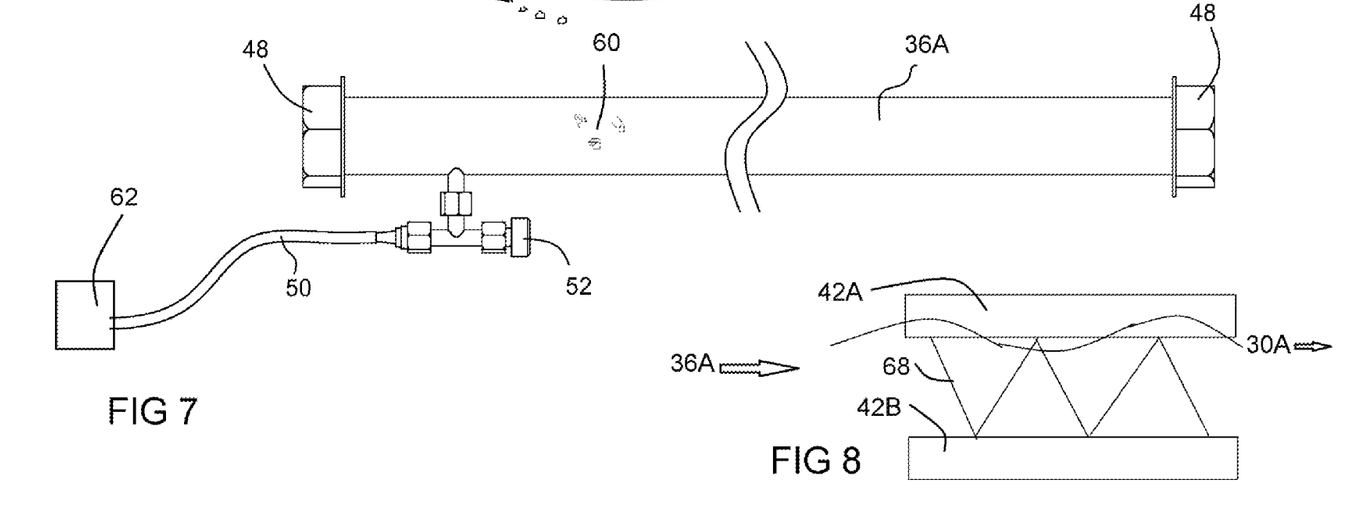
FIG. 7 is a front view of one of the rigid poles of the plate of FIG. 5 according to one embodiment.
FIG. 8 is a front view of one of the rigid poles of the plate of FIG. 5 according to another embodiment.

FIG. 7 is a front view of one of the rigid poles of the plate of FIG. 5 according to one embodiment.

According to one embodiment each of rigid poles 36A, 36B, etc. and other poles constitutes a closed cylinder (named also solid cylinder), for containing air 60, for floating on the water.

An air compressor 62 may fill rigid pole 36A with air.

According to one embodiment, each of rigid poles 36A, 36B, etc. and other poles constitutes any elongated form, the material thereof may include concrete for providing the strength and polystyrene foam, for providing the floating.

FIG. 8 is a front view of one of the rigid poles of the plate of FIG. 5 according to another embodiment.

According to one embodiment, pole 36A may include a top beam 42A; a bottom beam 42B; and affixed arms 68 in between, for improving the rigidity against rising and lowering of waves 30A.

Figure 9:
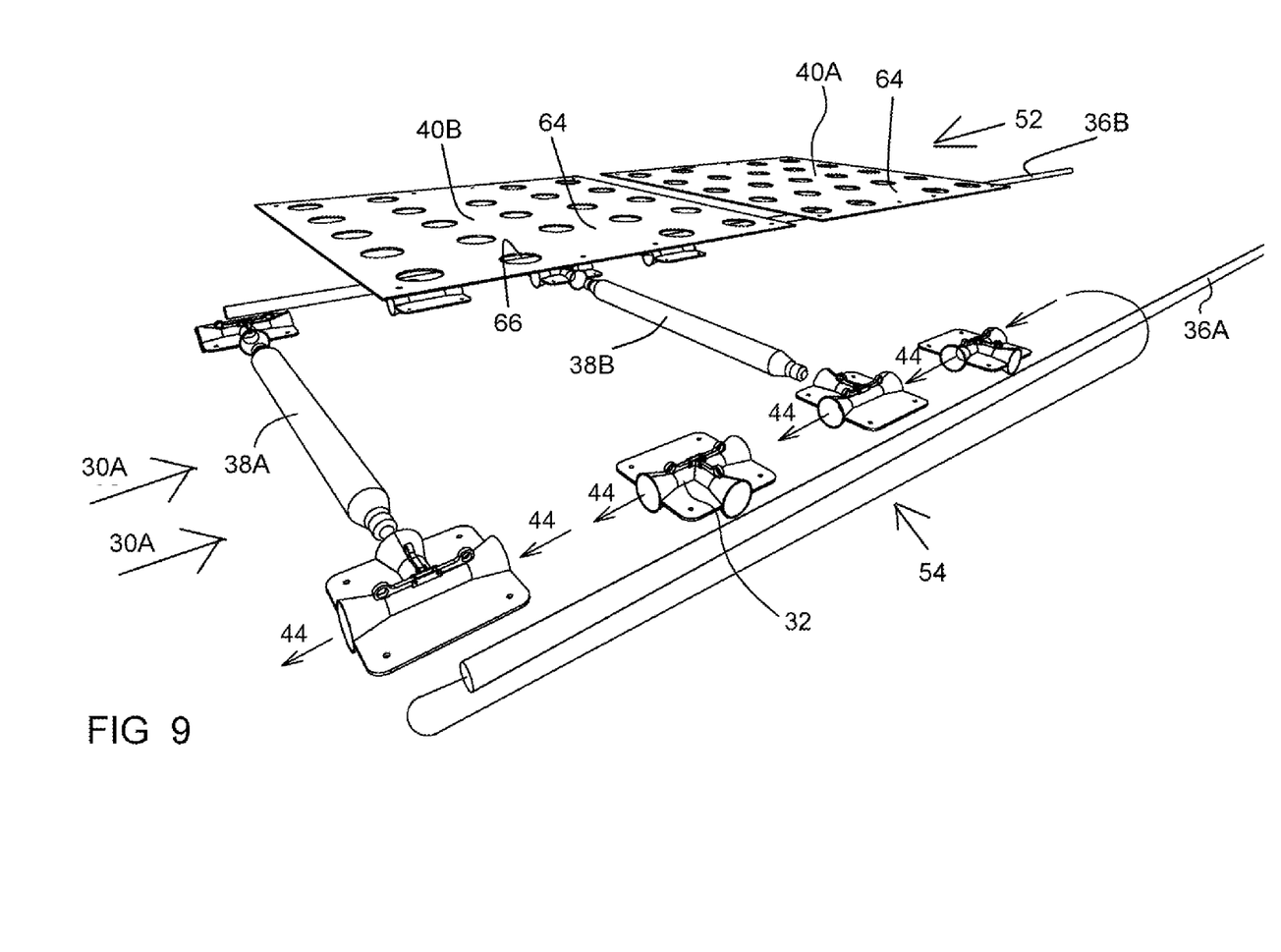
FIG. 9 describes the plate of FIG. 5 according to one embodiment, disassembled.

FIG. 9 describes the plate of FIG. 5 according to one embodiment, disassembled.

Rigid poles 36A, 36B, etc. extend across the entire width 56 of plate 22, and thus are herein named "width poles", and are disposed parallel one to the other.

Additional floating poles 38A, 38B, etc., may be disposed orthogonal to poles 36A, 36B, and thus are herein named "length poles".

Each of length poles 38A, 38B, etc., may be shorter than width poles 36A, 36B, etc., since the vector of water waves 30A does not tend to bend length poles 38A, 38B, etc. Each of subsidiary plates 40A, 40B, etc. may be placed between two parallel width rigid poles 36A and 36B and between two parallel length poles 38A and 38B.

The surfaces 64 of subsidiary plates 40A, 40B, etc. are which break waves 30A. Each of subsidiary plates 40A, 40B, etc. may be perforated (holes 66) for allowing water to sink through the plate. Subsidiary plates 40A, 40B, etc. may be optically transparent, for ecological consderations.

Figure 10:
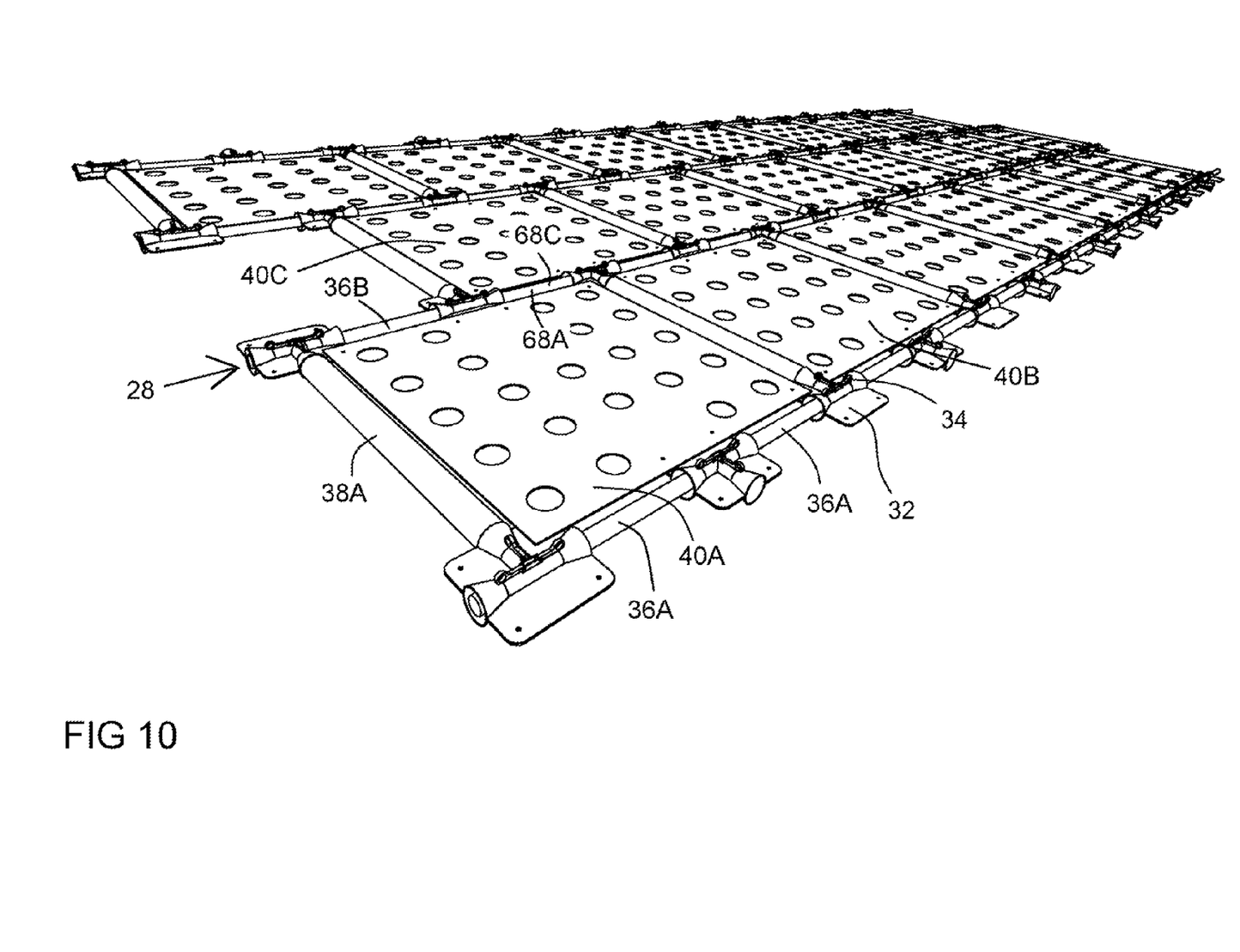
FIG. 10 describes the plate of FIG. 9 assembled.

FIG. 10 describes the plate of FIG. 9 assembled.

Subsidiary plates 40A and 40B are not foldable one in relation to the other due to rigid poles 36A and 36B fixing them one to the other. However, subsidiary plates 40A and 40B are preferably foldable in relation to subsidiary plate 40C, as rigid pole 36C functions as a folding line 28 therebetween.

A plurality of construction elements 32 allow constructing subsidiary plates 40A, 40B, etc. one to the other in a brick-wall pattern, i.e. by way of an example, such that a side 68C of subsidiary plate 40C attaches a fraction of a side 68A of subsidiary plate 40A and a fraction of a side 68B of subsidiary plate 40B, for providing improved strength.

Thus, in one aspect, the invention is directed to a floating breakwater (10A), including:
 a floating plate (22), width (54) thereof being at least one wavelength (12) and being non-bendable; and
 anchors (26), for anchoring the floating plate (22), thereby not allowing water waves (30A) propagating along the width (54) of the plate (22) to bend the width (54) of the plate (22), thereby not allowing the water waves (30A) to bend themselves along the at least one wavelength (12).

The floating plate (22) may include:
 a plurality of rigid regions, one (36A) disposed parallel to an adjacent (36B) region, each of the rigid regions (36A, 36B) extending along the width (54) of the plate (22), for receiving the water waves (30A) propagating along the rigid regions (36A, 36B),
 thereby not allowing the water waves (30A) propagating along the rigid regions (46A, 46B), to bend the plate (22) along the rigid regions (36A, 36B).

The floating plate (22) may further include:
 a plurality of bendable regions (28), disposed parallel to the rigid regions (36A, 36B),
 thereby allowing the water waves (30B) to bend the bendable regions (28), rather than break the rigid regions (36A, 36B).

The floating plate (22) may further include:
 a plurality of prefabricated modular elements (40A), being foldable (28) one in relation to the other parallel to the rigid regions (36A, 36B),
 thereby allowing quick assembling of the plate (22).

The anchors (26) may be characterized in sinking the floating plate (22) slightly below the sea level (72), all in an equal strength (70) applied by floating of the floating plate (22),
 thereby a plurality of the anchors (26) absorb together attacks of the waves (30A).

The floating plate (32) may be perforated (66),
 thereby allowing water to sink.

The floating plate (32) may be optically transparent,
 thereby reducing ecological impact.

The rigid regions (36A, 36B) may be floatable.

The floating plate (22) may include a plurality of subsidiary plates (40A, 40B) constructed in a brick-wall pattern.

The floating plate (22) may further include:
 a plurality of poles (38A, 38B), disposed erected to the rigid regions (36A, 36B); and
 a plurality of construction elements (32), for constructing the rigid regions (36A, 36B) and the poles (38A, 38B) one to the other.

In the figures and/or description herein, the following reference numerals (Reference Signs List) have been mentioned:
 numeral 10A denotes the breakwater according to one embodiment of the invention;
 numeral 10B denotes the harbor;
 numeral 12 denotes the wavelength;
 numeral 16 denotes an end of the plate being anchored;
 numeral 18 denotes a dock, for accessing the boats;
 numeral 20 denotes a boat;
 numeral 22 denotes the floating plate;
 numeral 24 denotes a stable lump for anchoring thereto;
 numeral 26 denotes the anchor;
 numeral 28 denotes a bendable line/region;
 numeral 30A denotes the water wave;
 numeral 32 denotes the construction element;
 numeral 34 denotes a quick fastener;
 numerals 36A, 36B, 36C and 36D denote rigid poles;
 numerals 40A and 49B denote subsidiary plates;
 numerals 42A and 42B denote beams of the rigid pole;
 numeral 44 denotes a hole of the construction element, for threading the pole thereinto and/or therethrough;
 numeral 48 denotes a cap of the pole, for containing air;
 numeral 52 denotes the long side (length) of the plate;
 numeral 54 denotes the short side (width) of the plate;

numeral 56 denotes the narrow side;
numeral 60 denotes contained air;
numeral 62 denotes an air compressor;
numeral 66 denotes a hole or perforation;
numeral 68 denote an affixing arm.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A floating breakwater (10A), comprising:
    a floating plate (22), width (54) thereof being at least one wavelength (12) and comprising
        a plurality of rigid regions, one (36A) disposed parallel to an adjacent (36B) region, wherein each of said rigid regions (36A, 36B) singly extends along said width (54) of said plate (22), for receiving water waves (30A) propagating along said rigid regions (36A, 36B), thereby not allowing said water waves (30A) propagating along said rigid regions (46A, 46B), to bend said plate (22) along said rigid regions (36A, 36B), and
        a plurality of subsidiary plates (40A, 40B), wherein each of said rigid regions (36A) comprises a hinge (28) between two of said subsidiary plates (40A, 40B), being adjacent to one another; and
    anchors (26), for anchoring said floating plate (22).

2. A floating breakwater (10A) according to claim 1, wherein at least one of said plurality of rigid regions (36A,36B) comprises a hinge.

3. A floating breakwater (10A) according to claim 1, wherein said anchors (26) are characterized in sinking said floating plate (22) slightly below a sea level (72), all in an equal strength (70) applied by floating of said floating plate (22),
    thereby a plurality of said anchors (26) absorb together attacks of said waves (30A).

4. A floating breakwater (10A) according to claim 1, wherein said floating plate (32) is perforated (66), thereby allowing water to sink.

5. A floating breakwater (10A) according to claim 1, wherein said floating plate (32) is optically transparent, thereby reducing ecological impact.

6. A floating breakwater (10A) according to claim 1, wherein said rigid regions (36A, 36B) are floatable.

7. A floating breakwater (10A) according to claim 1 wherein said floating plate (22) further comprises:
    a plurality of poles (38A, 38B), disposed perpendicular to said parallel rigid regions (36A, 36B) wherein ends of said poles (38A, 38B) do not meet one another;
    a plurality of construction elements (32), for connecting each of said poles (38A, 38B) between two adjacent regions of said rigid regions (36A,36B); and
    a plurality of subsidiary plates (40A, 40B), each disposed between two adjacent regions of said rigid regions (36A,36B) and between two adjacent poles of said poles (38A,38B) thereby in a brick-wall pattern,
thereby said brick-wall pattern strengthens said disallowing said water waves (30A) propagating along said rigid regions (46A, 46B), to bend said plate (22) along said rigid regions (36A, 36B), while allowing said water waves (30A) propagating along said rigid regions (46A, 46B), to bend said plate (22) perpendicular to said rigid regions (36A, 36B).

8. A floating breakwater (10A) comprising:
    a floating plate (22), width (54) thereof being at least one wavelength (12) and comprising a plurality of rigid regions, one (36A) disposed parallel to an adjacent (36B) region, wherein each of said rigid regions (36A, 36B) singly extends along said width (54) of said plate (22), for receiving water waves (30A) propagating along said rigid regions (36A, 36B), thereby not allowing said water waves (30A) propagating along said rigid regions (46A, 46B), to bend said plate (22) along said rigid regions (36A, 36B), and
    a plurality of prefabricated modular elements (40A), being foldable (28) one in relation to the other parallel to said rigid regions (36A, 36B), thereby allowing quick assembling of said plate (22); and
    anchors (26), for anchoring said floating plate (22).

* * * * *